United States Patent
Park et al.

(10) Patent No.: US 9,142,212 B2
(45) Date of Patent: Sep. 22, 2015

(54) APPARATUS AND METHOD FOR RECOGNIZING VOICE COMMAND

(76) Inventors: Chi-Youn Park, Suwon-si (KR);
Byung-Kwan Kwak, Yongin-si (KR);
Jeong-Su Kim, Yongin-si (KR);
Jeong-Mi Cho, Seongnam-si (KR)

( * ) Notice: Subject to any disclaimer, the term of this patent is extended or adjusted under 35 U.S.C. 154(b) by 1064 days.

(21) Appl. No.: 13/093,919

(22) Filed: Apr. 26, 2011

(65) Prior Publication Data

US 2012/0035935 A1 Feb. 9, 2012

(30) Foreign Application Priority Data

Aug. 3, 2010 (KR) ........................ 10-2010-0075038

(51) Int. Cl.
*G10L 21/00* (2013.01)
*G10L 15/22* (2006.01)
*G10L 15/00* (2013.01)
*H04M 1/00* (2006.01)
*H04M 1/64* (2006.01)

(52) U.S. Cl.
CPC ...................................... *G10L 15/22* (2013.01)

(58) Field of Classification Search
USPC ............. 704/239, 275, 215, 272, 257, 9, 238, 704/251, 246, 243, 201; 705/10; 379/88.03, 379/88.04, 201.01, 88.01; 455/566
See application file for complete search history.

(56) References Cited

U.S. PATENT DOCUMENTS

| 8,600,747 | B2 * | 12/2013 | Abella et al. .................. 704/239 |
| 2001/0021909 | A1 * | 9/2001 | Shimomura et al. .......... 704/275 |
| 2002/0131641 | A1 | 9/2002 | Luo et al. |
| 2004/0098253 | A1 * | 5/2004 | Balentine et al. .............. 704/215 |
| 2004/0120472 | A1 * | 6/2004 | Popay et al. ................ 379/88.01 |
| 2006/0100876 | A1 * | 5/2006 | Nishizaki et al. .............. 704/257 |
| 2007/0038436 | A1 * | 2/2007 | Cristo et al. ...................... 704/9 |
| 2007/0100618 | A1 * | 5/2007 | Lee et al. ....................... 704/238 |

(Continued)

FOREIGN PATENT DOCUMENTS

| JP | 2000-035798 | 2/2000 |
| JP | 2009-157905 | 7/2009 |
| JP | 2010-020273 | 1/2010 |

OTHER PUBLICATIONS

Constructing Accurate Beliefs in Spoken Dialog Systems by Dan Bohus and Alexander I. Rudnicky (Carnegie Mellon University Research Showcase 2005).*

(Continued)

*Primary Examiner* — Pierre-Louis Desir
*Assistant Examiner* — Neeraj Sharma (57) ABSTRACT

An apparatus and method for recognizing a voice command for use in an interactive voice user interface are provided. The apparatus includes a command intention belief generation unit that is configured to recognize a first voice command and that may generate one or more command intention beliefs for the first voice command. The apparatus also includes a command intention belief update unit that is configured to update each of the command intention beliefs based on a system response to the first voice command and a second voice commands. The apparatus also includes a command intention belief selection unit that is configured to select one of the updated command intention beliefs for the first voice command. The apparatus also includes an operation signal output unit that is configured to select a final command intention from the selected updated command intention belief and to output an operation signal based on the selected final command intention.

18 Claims, 7 Drawing Sheets

(56) References Cited

U.S. PATENT DOCUMENTS

| | | |
|---|---|---|
| 2007/0201659 A1* | 8/2007 | Altberg et al. ............ 379/201.01 |
| 2008/0319748 A1* | 12/2008 | Nakano et al. ................. 704/251 |
| 2009/0164215 A1* | 6/2009 | Lu et al. ........................ 704/246 |
| 2010/0027767 A1* | 2/2010 | Gilbert ....................... 379/88.03 |
| 2010/0091954 A1* | 4/2010 | Dayanidhi et al. ......... 379/88.04 |
| 2010/0138215 A1 | 6/2010 | Williams |
| 2010/0223060 A1* | 9/2010 | Chang et al. .................. 704/272 |
| 2010/0312561 A1 | 12/2010 | Di Profio |
| 2010/0332287 A1* | 12/2010 | Gates et al. ...................... 705/10 |
| 2011/0029311 A1* | 2/2011 | Minamino et al. ............ 704/243 |
| 2011/0069822 A1* | 3/2011 | Jan et al. .................... 379/88.04 |
| 2011/0105190 A1* | 5/2011 | Cha et al. ...................... 455/566 |
| 2011/0137654 A1* | 6/2011 | Williams ...................... 704/257 |
| 2011/0184730 A1* | 7/2011 | LeBeau et al. ................ 704/201 |

OTHER PUBLICATIONS

Talking to machines (statistically speaking) by Steve Young (Interspeech 2002).*

Spoken dialogue management using probabilistic reasoning by Nicholas Roy, Joelle Pineau and Sebastian Thrun (Proceedings of the 38th Annual Meeting on Association for Computational Linguistics, Association for Computational Linguistics, 2000).*

* cited by examiner

| COMMAND INTENTION | PROBABILITY |
| --- | --- |
| CHANNEL SWITCH (NAME OF BROADCASTING STATION = KBS1) | 0.72 |
| CHANNEL SWITCH (NAME OF BROADCASTING STATION = KBS2) | 0.14 |
| PRE-SCHEDULED RECORDING (NAME OF BROADCASTING STATION = KBS1) | 0.10 |
| OTHERS | 0.04 |

FIG. 2B

| WHETHER INPUT VOICE COMMAND HAS BEEN CONFIRMED | PROBABILITY |
|---|---|
| CONFIRMED | 0.82 |
| NOT CONFIRMED | 0.18 |

FIRST VOICE COMMAND : RECORD PROGRAM ON CHANNEL 11

RESPONSE : RECORDING COMPLETE

SECOND VOICE COMMAND : WHAT IS ON CHANNEL 7?

FIG. 5B

APPARATUS AND METHOD FOR RECOGNIZING VOICE COMMAND

CROSS-REFERENCE TO RELATED APPLICATION(S)

This application claims the benefit under 35 U.S.C. §119(a) of Korean Patent Application No. 10-2010-0075038, filed on Aug. 3, 2010, in the Korean Intellectual Property Office, the entire disclosure of which is incorporated herein by reference for all purposes.

BACKGROUND

1. Field

The following description relates to a technology for recognizing a voice command, and more particularly, to an apparatus and method for recognizing a voice command in an interactive voice user interface.

2. Description of the Related Art

Today's interactive voice interfaces have expanded into many different devices that include systems for booking a plane or a train and systems for withdrawing money like automated teller machines (ATMs). To properly use a system equipped with an interactive voice interface, there must be an appropriate dialogue model set in the system. In general, there are two representative dialogue models for recognizing a voice command, a rule-based dialogue model and a statistical dialogue model. The rule-based dialogue model uses a hypothesis that may be formulated according to a dialogue between a user and an interactive voice system to recognize the intention of the user. However, the rule-based dialogue model is required to enter frequently-used utterances, and all possible answers for the utterances, into an interactive voice system, thus making it difficult to properly handle various voice recognition errors.

The statistical dialogue model makes a probabilistic assumption based on the probabilities of results from voice recognition, and an appropriate response to an input voice command is determined based on those probabilistic assumptions. The statistical dialogue model, unlike the rule-based dialogue model, does not require all the possible utterance responses to be configured. In addition, the statistical dialogue model involves confirming the input voice command upon the occurrence of a voice recognition error and can thus contribute to the establishment of a stable dialogue model.

However, the statistical dialogue model may not be able to operate properly, especially when a user gives multiple commands or requests multiple searches at the same time. Problems may also occur when the intention of the user is not consistent throughout the course of the dialogue between the user and the interactive voice system. For example, a problem may occur when a user continues to issue commands that belong to different domains as compared to those of previous commands because the statistical dialogue model simply accumulates and updates the intentions of previous commands, but may struggle to keep up with changes in the intention of the user.

SUMMARY

In one general aspect, there is provided an apparatus for recognizing a voice command, the apparatus comprising a command intention belief generation unit configured to recognize a first voice command, and in response, configured to generate one or more command intention beliefs in consideration of one or more predefined possible cases, a command intention belief update unit configured to update each of the generated command intention beliefs based on a system response to the first voice command and a second voice command issued in response to the system response to the first voice command, a command intention belief selection unit configured to select one of the updated command intention beliefs for the first voice command, and an operation signal output unit configured to select a final command intention from the selected updated command intention belief and output an operation signal based on the selected final command intention.

The command intention belief update unit may comprise a second voice command recognizer configured to recognize the intention of the second voice command, a command intention change detector configured to compare the system response to the first voice command to the intention of the second voice command and determine whether the intention of a user has changed based on the results of the comparison, a command intention belief resetter configured to reset the command intention beliefs for the first voice command based on the results determined by the command intention change detector, and a command intention updater configured to update the reset command intention beliefs for the first voice command.

The command intention belief generation unit may be further configured to generate different command intention beliefs for the first voice command for different possible cases, the command intention belief update unit may be further configured to hierarchically update each of the different command intention beliefs, and the different possible cases may include when the intention of the user is uniformly maintained, when the intention of the user is slightly modified, and when the intention of the user is completely changed.

Each of the command intention beliefs for the first voice command may include at least one of the intention of the first voice command, information indicating whether the first voice command has been confirmed, information indicating whether the system response to the first voice command has been output, and information indicating whether the output signal has been output.

The command intention belief update unit may be further configured to continue updating the command intention beliefs for the first voice command until the operation signal output unit selects the final command intention.

The command intention belief selection unit may be further configured to select a lowest-entropy command intention belief from the updated command intention beliefs for the first voice command.

The command intention belief selection unit may be further configured to select one of the updated command intention beliefs for the first voice command based on particular information values of the corresponding command intention beliefs.

The command intention belief selection unit may be further configured to select one of the updated command intention beliefs for the first voice command based on a weighted average of the particular information values of the corresponding command intention beliefs.

The operation signal output unit may be further configured to select a final command intention from a highest-probability command intention belief selected from the updated command intention beliefs for the first voice command and output an operation signal based on the selected final command intention.

The operation signal output unit may be further configured to apply a positive reward value to operation signals that comply with the selected final command intention and a negative reward value to operation signals that do not comply with the selected final command intention, and the apparatus may select the operation signal with a highest reward value as an optimal operation signal for the first voice command.

In another aspect, there is provided a method of recognizing a voice command, the method comprising recognizing a first voice command and generating one or more command intention beliefs for the first voice command in consideration of one or more predefined possible cases, updating each of the command intention beliefs based on a system response to the first voice command and a second voice command issued in response to the system response to the first voice command, selecting an updated command intention belief for the first voice command, and selecting a final command intention from the selected updated command intention belief and outputting an operation signal based on the selected final command intention.

The updating of the command intention beliefs for the first voice command may comprise recognizing the intention of the second voice command, comparing the system response to the first voice command with the intention of the second voice command and determining whether the intention of a user has changed based on the results of the comparison, resetting the command intention beliefs for the first voice command based on the results of whether the intention of the user has changed, and updating the reset command intention beliefs for the first voice command.

The generating of the command intention beliefs for the first voice command may comprise generating different command intention beliefs for the first voice command for different possible cases, the updating of the command intention beliefs for the first voice command may comprise hierarchically updating each of the different command intention beliefs, and the different possible cases may include when the intention of the user is uniformly maintained, slightly modified, and completely changed.

Each of the command intention beliefs for the first voice command may include at least one of the intention of the first voice command, information indicating whether the first voice command has been confirmed, information indicating whether the system response to the first voice command has been output, and information indicating whether the output signal has been output.

The updating of the command intention beliefs for the first voice command may comprise continually updating the command intention beliefs for the first voice command until the final command intention is selected.

The selecting of the updated command intention belief for the first voice command may comprise selecting a lowest-entropy command intention belief from the updated command intention beliefs for the first voice command.

The selecting of the updated command intention belief for the first voice command may further comprise selecting one of the updated command intention beliefs for the first voice command based on particular information values of the corresponding command intention beliefs.

The selecting of the updated command intention belief for the first voice command may further comprise selecting one of the updated command intention beliefs for the first voice command based on a weighted average of the particular information values of the corresponding command intention beliefs.

The outputting of the output signal may comprise selecting a final command intention from a highest-probability command intention belief selected from the updated command intention beliefs for the first voice command and outputting an operation signal based on the selected final command intention.

The outputting of the output signal may comprise applying a positive reward value to operation signals that comply with the selected final command intention and a negative reward value to operation signals that do not comply with the selected final command intention, and selecting one of the operation signals with a highest reward value as an optimal operation signal for the first voice command.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
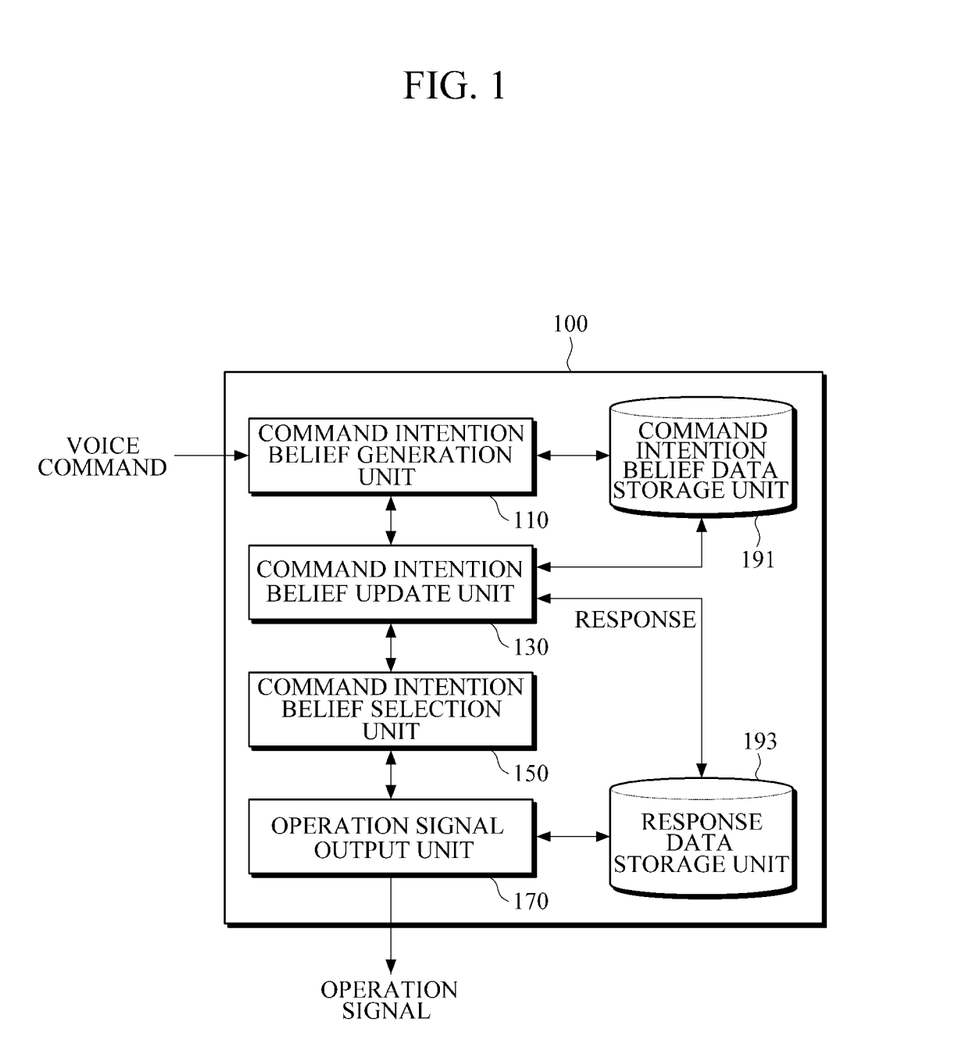
FIG. 1 is a diagram illustrating an example of an apparatus for recognizing a voice command.

FIG. 1 illustrates an example of an apparatus for recognizing a voice command.

Referring to FIG. 1, apparatus 100 includes a command intention belief generation unit 110, a command intention belief update unit 130, a command intention belief selection unit 150, an operation signal output unit 170, a command intention belief data storage unit 191, and a system response data storage unit 193. In this example, the command intention belief generation unit 110 and the command intention belief update unit 130 are connected to the command intention belief data storage unit 191. Also in this example, the command intention belief update unit 130 and the operation signal output unit 170 are connected to the response data storage unit 193.

The command intention belief generation unit 110 may recognize a first voice command input to the apparatus 100, and may create one or more command intention beliefs for the first voice command in consideration of one or more predefined possible cases based on the results of the recognition. The command intention beliefs for the first voice command may be probability distributions for the intention of the first voice command and may be created based on N-best candidate sentences for the first voice command and their reliability values. The command intention beliefs may probabilistically represent the intention of the first voice command in consideration of the predefined possible cases without limiting the scope of the intention of the first voice command. The apparatus 100 may generate a system response based on a command intention with a highest probability selected from among the command intention beliefs for the first voice command.

In this example, the command intention belief generation unit 110 may be connected to the command intention belief data storage unit 191, and the command intention belief data storage unit 191 may store the command intention beliefs for the first voice command. The command intention belief data storage unit 191 may store, not only the command intention beliefs for the first voice command, but other various data for creating the command intention beliefs for the first voice command. After the first voice command is recognized, the command intention belief generation unit 110 may fetch the data present in the command intention belief data storage unit 191 and may create one or more command intention beliefs for the first voice command based on the fetched data.

The command intention belief generation unit 110 may create one or more command intention beliefs for the first voice command in consideration of one or more predefined possible cases. Examples of predefined cases include when the intention of the user is uniformly maintained, when the intention of the user is slightly modified, and when the intention of the user is completely changed. For example, the command intention belief generation unit 110 may predict, before the second voice command is received in response to the system response to the first voice command, whether the intention of the user is uniformly maintained, slightly modified, or completely changed. The command intention belief may create one or more command intention beliefs for the first voice command based on the results of the prediction. The command intention beliefs for the first voice command may be stored in the command intention belief data storage unit 191.

The command intention belief update unit 130 may update the command intention beliefs for the first voice command based on the system response to the first voice command and the second voice command. For example, the system response to the first voice command may be a system response for one of the most appropriate command intentions selected from the command intention beliefs for the first voice command. The system response may not necessarily need to be the same as a final operation signal output by the apparatus 100. As an example, the apparatus 100 may precisely determine the intention of the first voice command by confirming the first voice command through a system response to the first voice command, for example, when the probability of a recognized command intention for the first voice command is not sufficiently high.

The second voice command may be given to the apparatus 100 in response to the system response to the first voice command. When the second voice command is received, the command intention belief update unit 130 may compare the system response to the first voice command and the second voice command and may determine whether the intention of the user has changed. For example, if the first voice command is "Turn to Channel 11," the system response to the first voice command may be "Channel 11 is on." If the second voice command is "Channel 7," the command intention belief update unit 130 may determine that the intention of the user has changed by comparing the system response to the first voice command and the second voice command.

For example, the command intention belief generation unit 110 may create three command intention beliefs for the first voice command in consideration of a plurality of possible cases. Examples of possible cases include when the intention of the user is consistent throughout the interaction, when the intention of the user is slightly modified during the interaction, and when the intention of the user is completely changed. The command intention belief generation unit 110 may store the three command intention beliefs in the command intention belief data storage unit 191. The command intention belief update unit 130 may receive the three command intention beliefs from the command intention belief data storage unit 191. Accordingly, the command intention belief update unit 130 may update the three command intention beliefs.

For example, the command intention belief update unit 130 may hierarchically updates the command intention beliefs for the first voice command until the operation signal for the first voice command is made. Because different command intention beliefs are created for the first voice command for different possible cases, the command intention belief update unit 130 may hierarchically update each of the different command intention beliefs.

The command intention belief update unit 130 may calculate the entropy of a command intention belief for the first voice command. For example, the command intention belief update unit 130 may calculate the likelihood that a command intention selected from the command intention belief will result in an imprecise system response or operation signal. In this example, a command intention selected from a high-entropy command intention belief is highly likely to result in an imprecise system response or operation signal, whereas a command intention selected from a low-entropy command intention belief is highly likely to result in a precise system response or operation signal.

As another example, the command intention belief update unit 130 and the command intention belief generation unit 110 may calculate the entropy of a command intention belief. For example, when the first voice command is received, the command intention belief generation unit 110 may create one or more command intention beliefs for the first voice command in consideration of one or more predefined possible cases, and may store the created command intention beliefs in the command intention belief data storage unit 191. The command intention belief update unit 130 may update the command intention beliefs stored in the command intention belief storage unit 191 in response to the second voice command, and may calculate the entropies of the updated command intention beliefs.

The command intention belief selection unit 150 may be provided with the updated command intention beliefs by the command intention belief update unit 130, and may select one of the updated command intention beliefs. The apparatus 100 may provide a single, most appropriate system response for each input voice command. Accordingly, the command intention belief selection unit 150 may select one of the updated command intention beliefs. For example, the command intention belief selection unit 150 may select one of the updated command intention beliefs based on the entropies of the updated command intention beliefs.

For example, the command intention belief selection unit 150 may select one of the updated command intention beliefs with a lowest entropy, thus reducing the probability of a failure to recognize a voice command. Even if the intention of the user changes in the middle of the operation of the apparatus 100, the apparatus 100 is able to output an optimal system response or operation signal by continually selecting a lowest-entropy command intention belief throughout the course of the a dialogue with the user.

As another example, the command intention belief selection unit 150 may select one of the updated command intention beliefs based on particular information values of the updated command intention beliefs or based on the weighted average of the particular information values of the updated command intention beliefs. For example, a weight may be applied to one of the updated command intention beliefs with a minimum number of confirmation system responses. In this example, the command intention belief selection unit 150 may select an optimal command intention belief and output the selected optimal command intention belief to the operation signal output unit 170.

The operation signal output unit 170 may select the most appropriate command intention from the command intention belief provided by the command intention belief selection unit 150, and may store the selected command intention in the system response data storage unit 193 in order to precisely determine the intention of the user. The operation signal output unit 170 may be provided with a single command intention belief by the command intention belief selection unit 150 and may select one of a number of command intentions in the single command intention belief. The operational signal output unit 170 may generate a system response based on the selected command intention, and may output the generated system response.

The system response data storage unit 193 may store not only the system response generated by the operation signal output unit 170, but also various other data that may be used by the operation signal output unit 170 to generate the corresponding system response. Therefore, the operation signal output unit 170 may select a command intention from the command intention belief provided by the command intention belief selection unit 150. Accordingly, the operation signal output unit 170 may select an optimal system response for the selected command intention from the system response data storage unit 193, and may output the selected system response.

For example, the operation signal output unit 170 may select a final command intention from the command intention belief provided by the command intention belief selection unit 150, and may output an operation signal corresponding to the selected final command intention. As one example, the operation signal may be a control signal that may be used for controlling a module to which the apparatus 100 is connected. For example, if the apparatus 100 is connected to a train ticket reservation system, the operation signal output unit 170 may output an operation signal indicating the intention of the first voice command (for example, booking two tickets for a train from Chicago to Kansas City) to the train ticket reservation system.

The final command intention may be a command intention that does not have a system response that is generated for an input voice command because it is assumed that the intention of the input voice command is already determined, and therefore it is used as the basis for outputting an operation signal. For example, the operation signal output unit 170 may select a command intention with a probability of 95% or higher from the command intention belief provided by the command intention belief selection unit 150 as the final command intention. As another example, the operation signal output unit 170 may determine the final command intention based on the two highest-probability command intentions in the command intention belief, which is provided by the command intention belief selection unit 150.

As another example, the operation signal output unit 170 may determine the final command intention using a Q-learning algorithm. The Q learning is a reinforcement learning technique that works by learning an action-value function that gives the expected utility of taking a given action in a given state and following a fixed policy afterwards. For example, the Q learning algorithm may be represented by Equation (1):

$$Q(s, a) = R(s, a) + \gamma \max_{a'}[Q(s', a')] \quad (1)$$

where Q(s,a) indicates a current total reward value, Q(s',a') indicates a future total reward value, R(s,a) indicates a reward value of a current operation signal for a command intention s and a system response α, and γ indicates a discount factor.

For example, if an operation signal that complies with a command intention selected from a given command intention belief is output, a positive reward value may be applied to the operation signal. As another example, if an operation signal that does not comply with a command intention selected from a given command intention belief is output, a negative reward value may be applied to the operation signal. For example, an operation signal with a highest reward value may be output as an optimal operation signal for the selected command intention.

The apparatus 100 may be implemented as an interactive voice user interface and may be installed in various electronic products such as phone reservation systems, multimedia devices (e.g., a TV or a mobile phone), robots, kiosks, and the like.

Figure 2A:
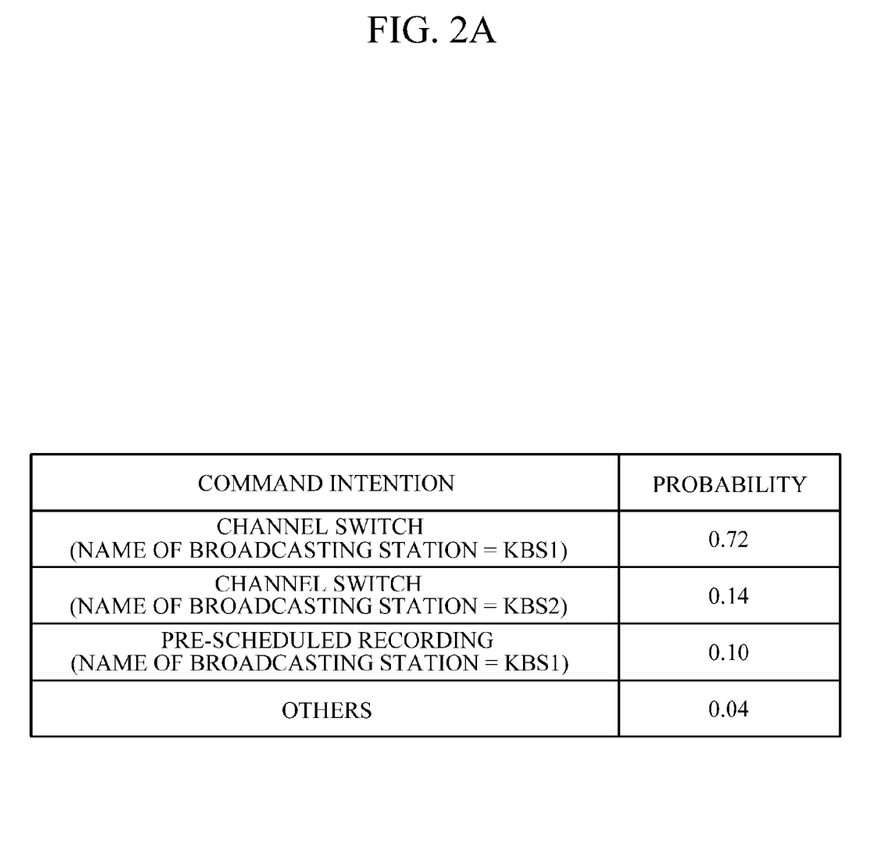
FIGS. 2A and 2B are diagrams illustrating examples of a command intention belief and a confirmed command intention belief, respectively.
Figure 2B:
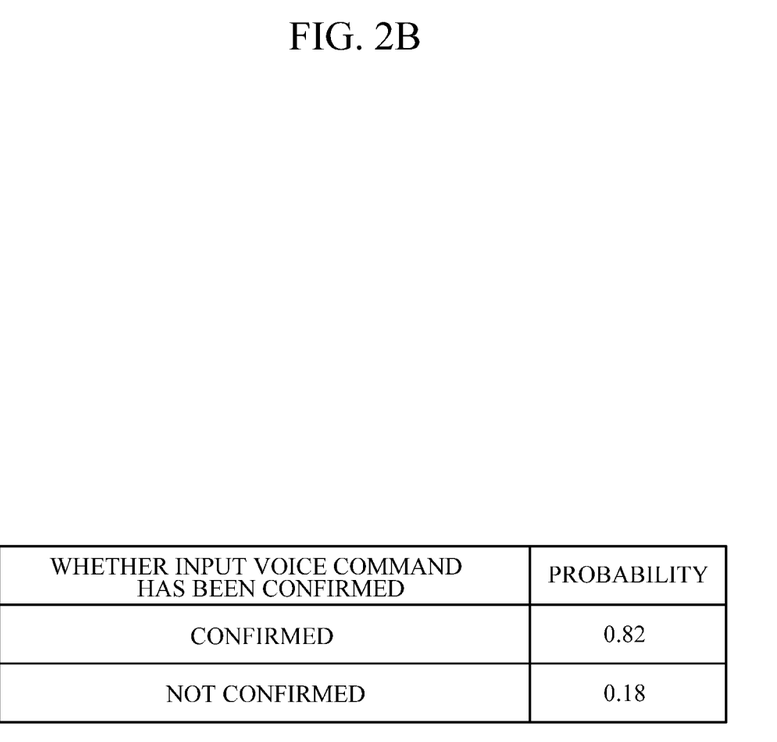

FIGS. 2A and 2B illustrate examples of a command intention belief and a confirmed command intention belief respectively. For example, the command intention belief and the confirmed command intention belief may be created by the command intention belief generation unit 110 that is shown in FIG. 1.

Referring to FIG. 2A, the command intention belief may include a plurality of command intentions and their respective probabilities. For example, when an input voice command is "Turn on KBS1," the probability of a command intention 'Channel Switch' may be set to a value that is higher than the probability of a command intention 'Pre-Scheduled Recording.' The probabilities of the command intentions may be set according to how the command intentions are consistent with the intention of the input voice command, and thus are not limited to the examples shown in FIG. 2A.

Referring to FIG. 2B, the confirmed command intention belief may include a probability distribution for whether there has been a system response confirming an input voice command. For example, if the input voice command is "Record the program on Channel 11," the confirmed command intention belief may probabilistically represent whether there has been a system response that says "Would you like to record the program on Channel 11?" because it is not sure that there has ever been any system response to the input voice command. Accordingly, it is possible to prevent any unnecessary repeated system responses confirming the input voice command.

Figure 3:
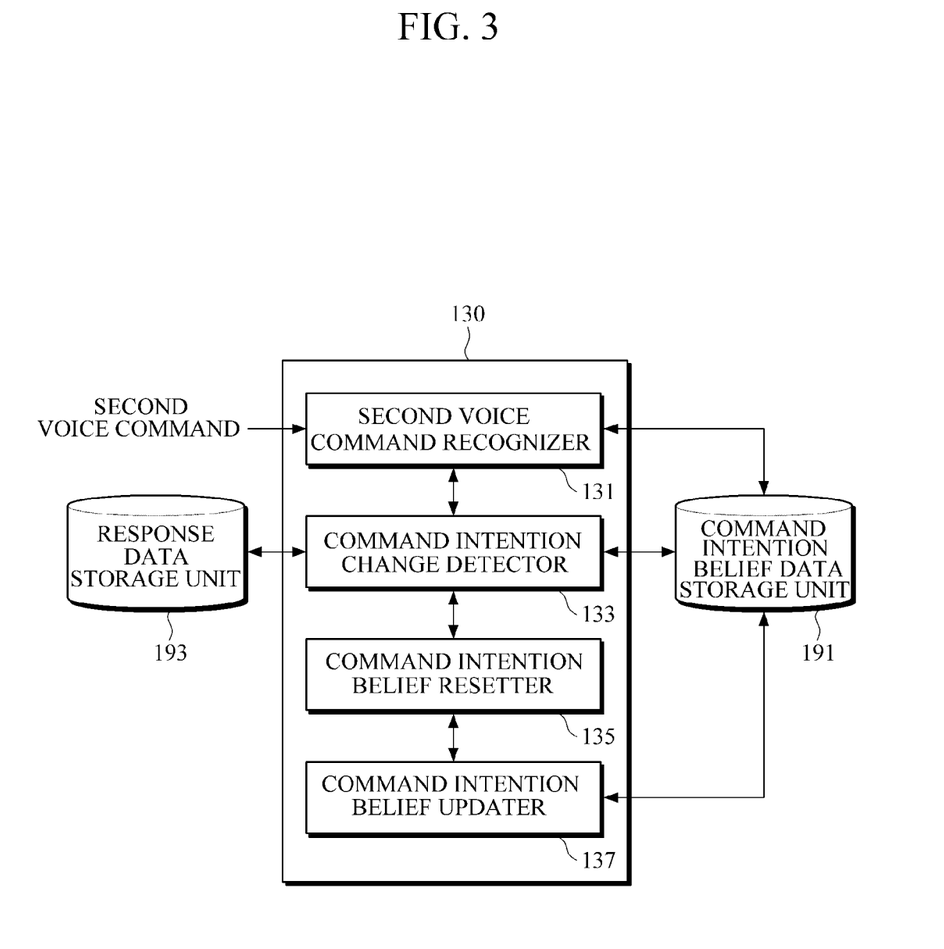
FIG. 3 is a diagram illustrating an example of a command intention belief update unit.

FIG. 3 illustrates an example of the command intention belief update unit.

Referring to FIG. 3, command intention belief update unit 130 includes a second voice command recognizer 131, a command intention change detector 133, a command intention belief resetter 135, and a command intention belief updater 137.

The second voice command recognizer 131 may recognize the intention of the second voice command, which is issued in response to the system response to the first voice command. For example, the second voice command recognizer 131 may receive the second voice command from the user through the command intention belief generation unit 110 shown in FIG. 1. As another example, the second voice command recognizer 131 may also receive the second voice command directly from the user. The second voice command recognizer 131 may generate N-best candidate sentences for the second voice command and their respective reliability values, where N is a real number. The N-best candidate sentences for the second voice command and their respective reliability values may be stored in the command intention belief data storage unit 191, and they may be output to the command intention change detector 133.

The command intention change detector 133 may compare the system response to the first voice command and the second voice command and may determine whether the intention of the user has changed. For example, the command intention change detector 133 may compare the system response to the first voice command, which is output by the operation signal output is unit 170 with results from the recognition of the intention of the second voice command, which are provided by the second voice command recognizer 131, and may determine whether the intention of the user has changed. The command intention change detector 131 may represent the results of the determination, as indicated by Equations (2), (3) and (4):

$$P(s' \mid s, a) = \begin{cases} 1, & s' = s \\ 0, & s' \neq s; \end{cases} \quad (2)$$

$$P(s' \mid s, a) = \frac{1}{|S|}; \text{ and} \quad (3)$$

$$P(s' \mid s, a) = \begin{cases} 0, & s' = s \\ \frac{1}{|S_S| - 1}, & s' \notin S_S \\ 0, & \text{otherwise} \end{cases} \quad (4)$$

where $P(s'\mid s, \alpha)$ indicates the probability of a current command intention s' being consistent with a previous command intention s and $S_s$ indicates a set of command intentions modified from the intention of the first voice command. Equations (2), (3), and (4) respectively represent the cases when the intention of the second voice command is consistent with the intention of the first voice command, when the intention of the second voice command is a new command intention different from the intention of the first voice command, and when the intention of the second voice command is a slight modification of the intention of the first voice command.

For example, the command intention detector 133 may determine whether the intention of the second voice command is consistent with the intention of the first voice command using Equations (2), (3) and (4), and may output the results of the determination to the command intention belief resetter 135.

The command intention belief resetter 135 may reset the command intention beliefs for the first voice command based on whether the intention of the second voice command is consistent with the intention of the first voice command. For example, if the intention of the second voice command is determined to be consistent with the intention of the first voice command, the command intention belief resetter 135 may lower the probability of command intentions in a command intention belief, which is created based on the anticipation that the intention of the second voice command would be consistent with the intention of the first voice command may decrease. The command intention belief resetter 135 may output the results of the resetting to the command intention belief updater 137.

The command intention belief updater 137 may update the command intention beliefs for the first voice command based on the results of the resetting performed by the command intention belief resetter 135, as indicated by Equation (5):

$$b(s') = P(o \mid s', a) \sum_{s \notin S} P(s' \mid s, a) b(s) \quad (5)$$

where b(s') indicates a command intention belief for the current command intention s', b(s) indicates a command intention belief for the previous command intention s, $P(o\mid s', \alpha)$ indicates the probability that the user responds to the system response a by saying an expression o for the current command intention s', and $P(s'\mid s, \alpha)$ indicates the probability of the current command intention s' being consistent with the previous command intention s.

For example, the current command intention s' may be "turning on Channel 11". If the system response α is "What would you like to do?" the user may respond by saying "Turn to Channel 11." If the system response α is "Would you like to watch Channel 11?" the user may respond by saying "Yes." If the system response α is "What channel would you like to watch?" the user may respond by saying "Channel 11." That is, the wording of the second voice command may vary according to the system response α.

For example, the command intention belief updater 137 may hierarchically update each of the command intention beliefs for the first voice command in consideration of the following possible cases, when the intention of the user is uniformly maintained, when the intention of the user is slightly modified, and when the intention of the user is completely changed. The updated command intention beliefs for the first voice command may be stored in the command intention belief storage unit 191.

The command intention belief update unit 130 may also include an entropy calculator (not shown). The entropy calculator may calculate the entropy of a command intention belief, as indicated by Equation (6):

$$E = \sum_{s \in S} -p(s) \log p(s) \quad (6)$$

where p(s) indicates the probability of the command intention s. For example, the entropy of a command intention belief that is uniformly maintained throughout the course of a dialogue with the user may decrease to a value that is approximately 0. On the other hand, the entropy of a command intention belief that is found to be new due to recognition error, as an example, may increase.

Figure 4:
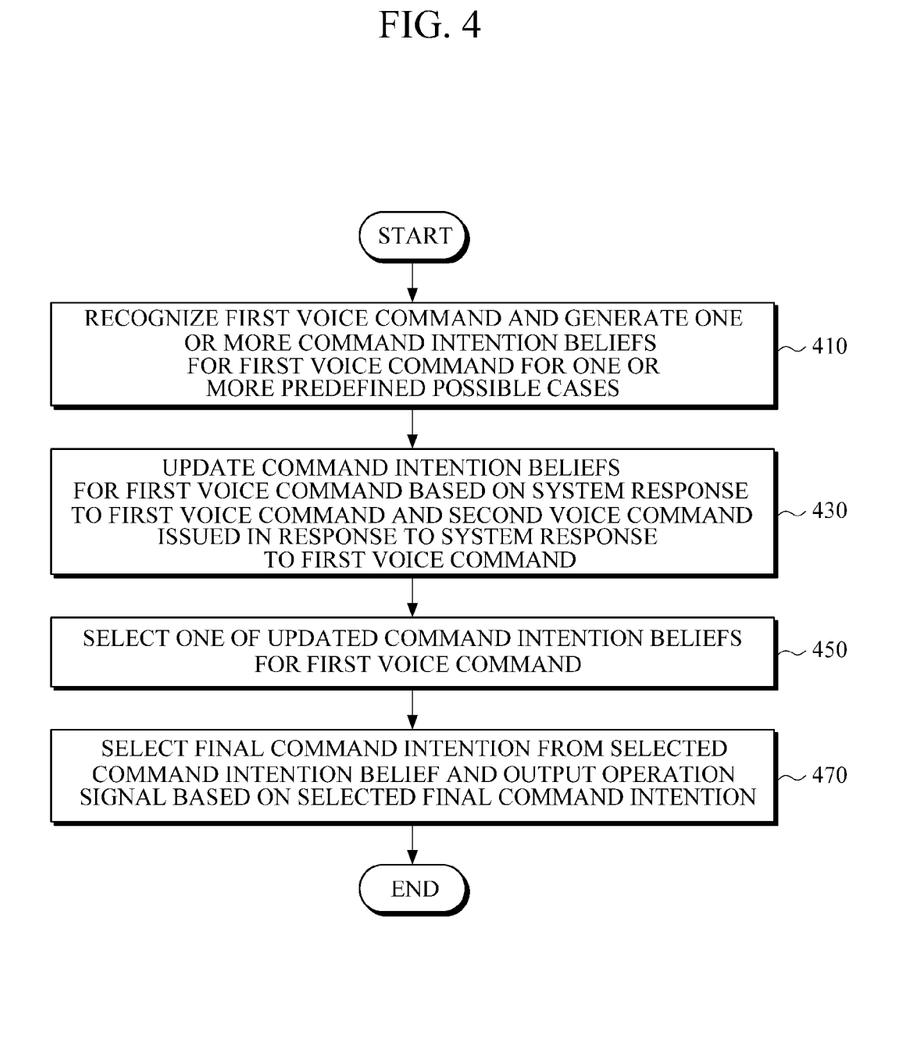
FIG. 4 is a flowchart illustrating an example of a method for recognizing a voice command.

FIG. 4 illustrates an example of a method for recognizing a voice command.

Referring to FIG. 4, the apparatus may recognize a first voice command input and may create one or more command intention beliefs for the first voice command in consideration of one or more predefined possible cases based on the results of the recognition, in 410. For example, the apparatus may create one or more command intention beliefs for the first voice command in consideration of the predefined possible cases based on N-best candidate sentences for the first voice command and their respective reliability values. For example, the predefined possible cases may include situations when the intention of the user is uniformly maintained, when the intention of the user is slightly modified, and when the intention of the user is completely changed.

In 430, the apparatus may update each of the command intention beliefs for the first voice command based on a system response to the first and the second voice commands, which is input into the apparatus in response to the system response. For example, in 430 the apparatus may take into consideration whether the intention of the user is uniformly maintained, slightly modified, or completely changed. For example, the apparatus may select one of the command intention beliefs for the first voice command, and may select a most appropriate command intention from the selected command intention belief. The apparatus may generate and output an appropriate system response based on the selected command intention, and may update the command intention beliefs for the first voice command by comparing the system response to the second voice command.

In 450, the apparatus may select one of the updated command intention beliefs. For example, the apparatus may calculate the entropies of the updated command intention beliefs and may select an optimal command intention belief. For example, the apparatus may select a lowest-entropy command intention belief, from the updated command intention beliefs, based on the results of the calculation. This is further described with reference to FIGS. 5A and 5B.

Figure 5A:
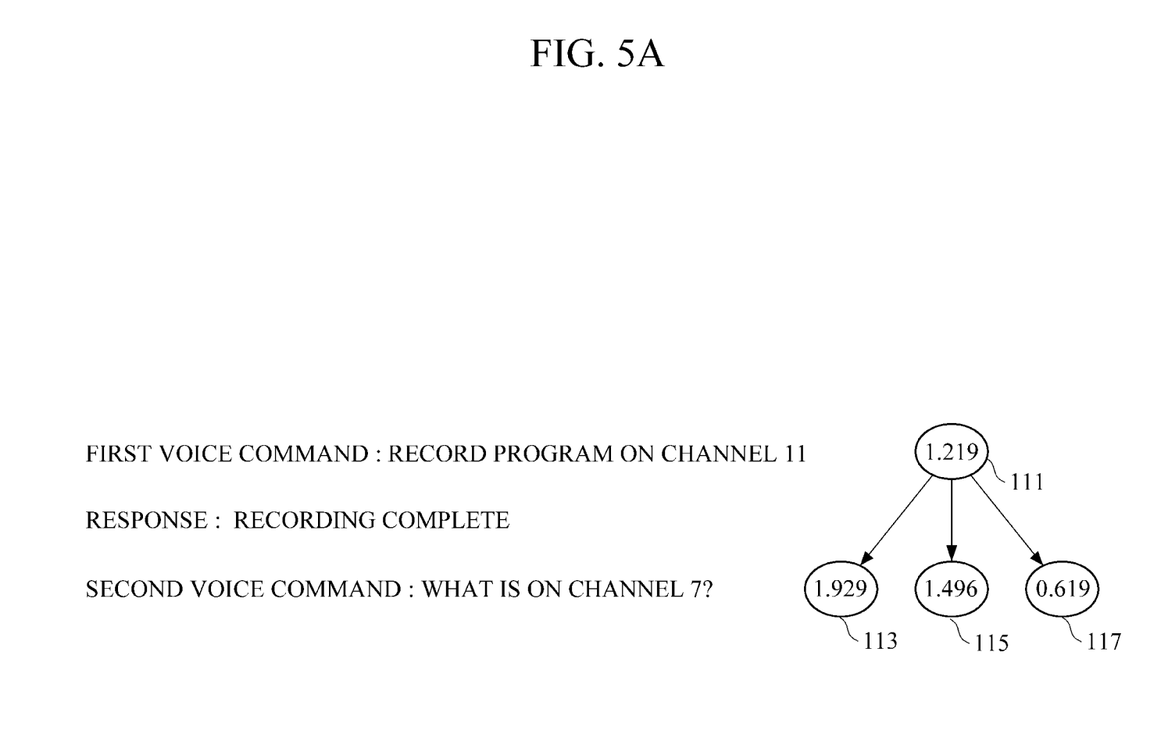
FIG. 5A is a diagram illustrating an example of how the entropy of a command intention belief varies throughout the course of a dialogue with a user.
Figure 5B:
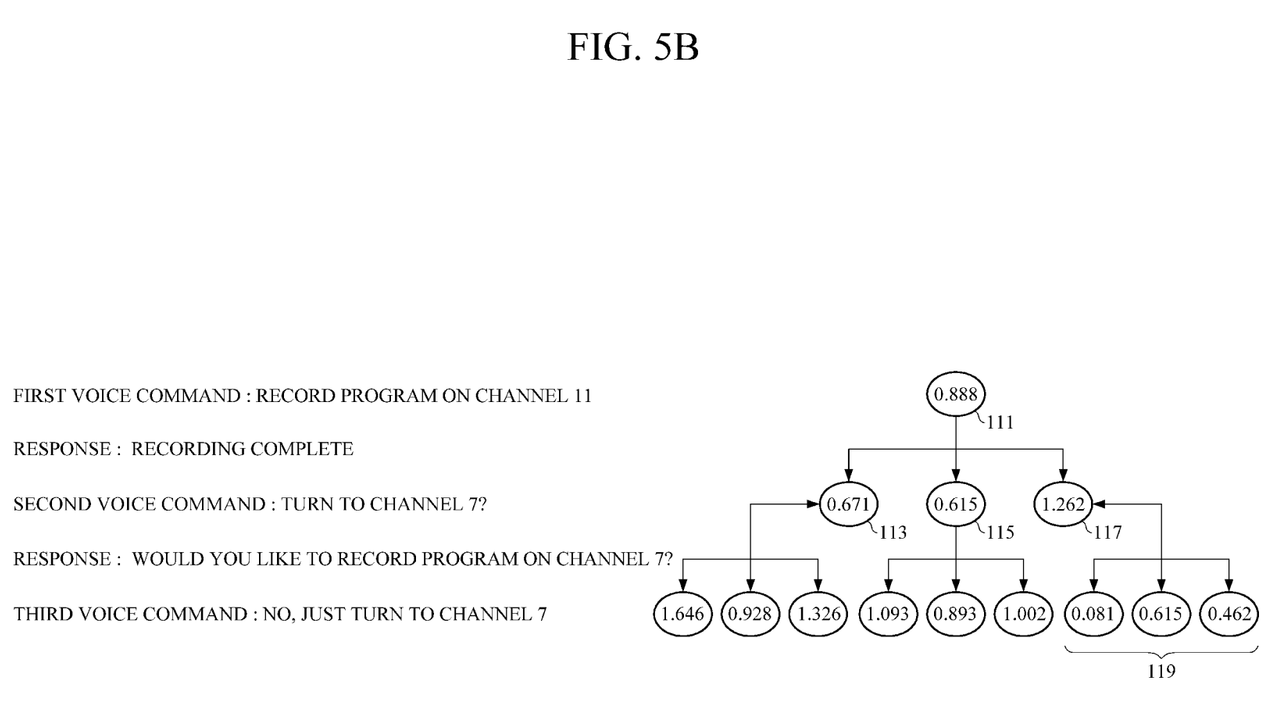
FIG. 5B is a diagram illustrating an example of how to determine the time when the intention of a user changes based on the entropy of a command intention belief.

FIG. 5A illustrates an example of how the entropy of a command intention belief varies throughout the course of a dialogue. FIG. 5B illustrates an example of how to detect the time of change in the intention of a user based on variations in the entropy of a command intention belief.

Referring to FIG. 5A, when a first voice command is "Record the program on Channel 11," a system response to the first voice command may be "Recording complete." The second voice command issued in response to the system response may be "What program is on Channel 7?" which determines that the intention of the second voice command has a new command intention different from the intention of the first voice command. In this example, a command intention belief 111 for the first voice command has an entropy of 1.219. A command intention belief 113 for the second voice command for the case when the intention of the second voice command is consistent with the intention of the first voice command has entropy of 1.929. A command intention belief 115 for the second voice command for the case when the intention of the second voice command is a slight modification of the intention of the first voice command has entropy of 1.496. A command intention belief 117 for the second voice command for the case when the intention of the second voice command is a new command intention different from the intention of the first voice command has entropy of 0.619. In this example, the apparatus 100 may select the command intention belief 117 because it has the lowest entropy.

Referring to FIG. 5B, when the first voice command is "Record the program on Channel 11," the system response to the first voice command may be "Recording complete," and the second voice command issued in response to the system response is "Turn to Channel 7," the command intention belief 115 may have the lowest entropy of 0.615, even though the intention of the second voice command is determined to be a new command intention. However, if a message "Would you like to record the program on Channel 7?" is output as a system response to the second voice command and a message "No, just turn to Channel 7" is input as a third voice command, one of three command intention beliefs 119, which are all obtained by updating the command intention belief 117, for the case when intention of the third voice command is consistent with the intention of the second voice command may have a lowest entropy. The apparatus 100 may select the command intention belief 119 for the case when intention of the third voice command is consistent with the intention of the second voice command.

Referring back to FIG. 4, the apparatus may select a final command intention from the command intention belief selected in 450, and may output an operation signal based on the selected final command intention, in 470. For example, the apparatus may select a highest-probability command intention from the command intention belief selected in 450.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As described above, it is possible to properly reflect the change in a user's intent, which will reduce the probability of failure to recognize the input voice command. In addition, it is possible to improve the general performance of voice command recognition in comparison to the typical dialogue recognition model.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for recognizing a voice command, the apparatus, comprising:
    a probability distribution of a command intention generator, implemented by a processor, configured to recognize a first voice command, and in response, configured to generate probability distributions of the command intention in consideration of predefined possible cases;

a probability distribution of the command intention updater, implemented by a processor, configured to update each of the probability distributions of the command intention based on a system response based on one or the generated probability distributions of the command intention to the first voice command and a second voice command issued in response to the system response;

a probability distribution of the command intention selector, implemented by a processor, configured to select one of the updated probability distributions of the command intention for the first voice command: and an operation signal generator, implemented by a processor, configured to select a final command intention from the selected updated probability distributions of the command intention and output an operation signal based on the selected final command intention;

wherein the probability distribution of the command intention generator, implemented by the processor therefor, is further configured to generate different probability distributions of the command intention for the first voice command for different possible cases, the probability distribution of the command intention updater, implemented by the processor therefor, is further configured to hierarchically update each of the different probability distributions of the command intention, and the different possible cases include when the intention of the user is uniformly maintained, when the intention of the user is slightly modified, and when the intention of the user is completely changed.

2. The apparatus of claim 1, wherein the probability distribution of the command intention updater comprises:

a second voice command recognizer configured to recognize the intention of the second voice command;

a command intention change detector configured to compare the system response to the first voice command to the intention of the second voice command and determine whether the intention of a user has changed based on the results of the comparison;

a probability distribution of the command intention resetter configured to reset the probability distribution of the command intention for the first voice command based on the results determined by the command intention change detector; and a command intention updater configured to update the reset probability distributions of the command intention for the first voice command.

3. The apparatus of claim 1, wherein each of the probability distributions of the command intention for the first voice command includes at least one of the intention of the first voice command, information indicating whether the first voice command has been confirmed, information indicating whether the system response to the first voice command has been output, and information indicating whether the output signal has been output.

4. The apparatus of claim 1, wherein the probability distribution of the command intention updater is further configured to continue updating the probability distributions of the command intention for the first voice command until the operation signal output unit selects the final command intention.

5. The apparatus of claim 1, wherein the probability distribution of the command intention selector is further configured to select a lowest-entropy probability distribution of the command intention from the probability distributions of the command intention for the first voice command.

6. The apparatus of claim 3, wherein the probability distribution of the command intention selector is further configured to select one of the updated probability distributions of the command intention for the first voice command based on particular information values of the corresponding probability distributions of the command intention.

7. The apparatus of claim 3, wherein the probability distribution of the command intention selector is further configured to select one of the updated probability distributions of the command intention for the first voice command based on a weighted average of the particular information values of the corresponding probability distributions of the command intention.

8. The apparatus of claim 1, wherein the operation signal generator is further configured to select a final command intention from a highest-probability probability distribution of the command intention selected from the updated probability distributions of the command intention for the first voice command and output an operation signal based on the selected final command intention.

9. The apparatus of claim 1, wherein the operation signal generator is further configured to apply a positive reward value to operation signals that comply with the selected final command intention and a negative reward value to operation signals that do not comply with the selected final command intention, and the apparatus selects the operation signal with a highest reward value as an optimal operation signal for the first voice command.

10. A method of recognizing a voice command, the method comprising:

recognizing a first voice command and generating probability distributions of the command intention for the first voice command in consideration of predefined possible cases;

updating each of the probability distributions of the command intention based on a system response based on one of the generated probability distributions of the command intention to the first voice command and a second voice command issued in response to the system response;

selecting an updated probability distribution of the command intention for the first voice command; and selecting a final command intention from the selected updated probability distributions of the command intention outputting an operation signal based on the selected final command intention, wherein the method of recognizing the voice command is implemented by at least a processor;

wherein the generating of the probability distributions of the command intention for the first voice command comprises generating different probability distributions of the command intention for the first voice command for different possible cases, the updating of the probability distributions of the command intention for the first voice command comprises hierarchically updating each of the different probability distributions of the command intention, and the different possible cases include when the intention of the user is uniformly maintained, slightly modified, and completely changed.

11. The method of claim 10, wherein the updating of the probability distribution of the command intention for the first voice command comprises:

recognizing the intention of the second voice command;

comparing the system response to the first voice command with the intention of the second voice command and determining whether the intention of a user has changed based on the results of the comparison;

resetting the probability distributions of the command intention for the first voice command based on the results of whether the intention of the user has changed; and updating the reset probability distributions of the command intention for the first voice command.

12. The method of claim 10, wherein each of the probability distributions of the command intention for the first voice command includes at least one of the intention of the first voice command, information indicating whether the first voice command has been confirmed, information indicating whether the system response to the first voice command has been output, and information indicating whether the output signal has been output.

13. The method of claim 10, wherein the updating of the probability distributions of the command intention for the first voice command comprises continually updating the probability distributions of the command intention for the first voice command until the final command intention is selected.

14. The method of claim 10, wherein the selecting of the updated probability distributions of the command intention for the first voice command comprises selecting a lowest-entropy probability distribution of the command intention from the updated probability distributions of the command intention for the first voice command.

15. The method of claim 12, wherein the selecting of the updated probability distributions of the command intention for the first voice command further comprises selecting one of the updated probability distributions of the command intention for the first voice command based on particular information values of the corresponding probability distributions of the command intention.

16. The method of claim 12, wherein the selecting of the updated probability distribution of the command intention for the first voice command further comprises selecting one of the updated probability distributions of the command intention for the first voice command based on a weighted average of the particular information values of the corresponding probability distributions of the command intention.

17. The method of claim 10, wherein the outputting of the output signal comprises selecting a final command intention from a highest-probability probability distribution of the command intention selected from the updated probability distributions of the command intention for the first voice command and outputting an operation signal based on the selected final command intention.

18. The method of claim 10, wherein the outputting of the output signal comprises applying a positive reward value to operation signals that comply with the selected final command intention and a negative reward value to operation signals that do not comply with the selected final command intention, and selecting one of the operation signals with a highest reward value as an optimal operation signal for the first voice command.

* * * * *